United States Patent [19]

Ehrenberg et al.

[11] Patent Number: 5,468,574
[45] Date of Patent: Nov. 21, 1995

[54] FUEL CELL INCORPORATING NOVEL ION-CONDUCTING MEMBRANE

[75] Inventors: Scott G. Ehrenberg, Fishkill; Joseph Serpico, Troy; Gary E. Wnek, Latham; Jeffrey N. Rider, Troy, all of N.Y.

[73] Assignee: Dais Corporation, Fishkill, N.Y.

[21] Appl. No.: 247,285

[22] Filed: May 23, 1994

[51] Int. Cl.⁶ ............................. H01M 8/10; C08J 5/20
[52] U.S. Cl. ............................. 429/33; 521/25; 521/27
[58] Field of Search ................. 521/27, 25; 429/33; 204/252, 258, 259

[56] References Cited

U.S. PATENT DOCUMENTS

| | | | |
|---|---|---|---|
| 3,341,366 | 9/1967 | Hodgdon et al. | 136/86 |
| 3,392,096 | 7/1968 | Lawton et al. | 204/159.15 |
| 3,484,293 | 12/1969 | Hodgdon | 136/86 |
| 3,577,357 | 5/1971 | Winkler | 260/2.2 |
| 4,119,616 | 10/1978 | O'Farrell | 526/31 |
| 4,673,454 | 6/1987 | Liu et al. | 521/27 |
| 4,738,764 | 4/1988 | Chlanda et al. | 521/33 |
| 4,849,311 | 7/1989 | Itoh et al. | 429/192 |
| 5,239,010 | 8/1993 | Balas et al. | 525/314 |

FOREIGN PATENT DOCUMENTS 2124635   2/1984   United Kingdom.

OTHER PUBLICATIONS

Gray et al. "Novel Polymer Electrolytes Based on ABA Block Copolymers" *Macromolecules* 21, 392–397 (1988).
Nolte et al. "Partially sulfonated poly(arylene ether sulfone)–A versatile proton . . ."–*J. Mem. Sci.* 83, 211–220 (1993).
Narebska et al. "Microstructure of Permselective Ion Exchange Membranes" *Roczniki Chemii* 48, 1761–1768 (1974).
Ceynowa et al. "Membrane Fuel Cells, Part II Decomposition in the Ion . . ." *Roczniki Chemii* 48, 1537–1543 (1974).
Narebska et al. "Membrane Fuel cells. 1. Oxygen–hydrogen fuel cell . . ." *Chem. Abstr.* 83: 633454a (1975).
Ceynowa et al. "Comparative investigations on cation exchange membranes . . ." *Chem. Abstr.* 81: 80122b (1973).
Wilson et al. "Thin–film catalyst layers for polymer electrolyte fuel" *J. Appl. Electrochem.* 22, 1–7 (1992).
Valint et al. "Synthesis and Characterization of Hydrophobically Associating . . ." *Macromolecules* 21, 175–179 (1988).

*Primary Examiner*—Peter F. Kulkosky
*Attorney, Agent, or Firm*—Heslin & Rothenberg

[57] ABSTRACT

Fuel cells incorporating a novel ion-conducting membrane are disclosed. The membrane comprises a plurality of acid-stable polymer molecules each having at least one ion-conducting component covalently bonded to at least one flexible connecting component. The membrane has ion-conducting components of the polymer molecules ordered such that a plurality of continuous ion-conducting channels penetrate the membrane from a first face to a second face and such that the ion-conducting channels are situated in an elastic matrix formed by the flexible connecting components. A preferred membrane is obtained by (1) sulfonating SEBS with sulfur trioxide under conditions that result in greater than 25 mol % sulfonation and (2) heating the polymer.

7 Claims, 1 Drawing Sheet

FUEL CELL INCORPORATING NOVEL ION-CONDUCTING MEMBRANE

FIELD OF THE INVENTION

The present invention relates to fuel cells and in particular, to ion-conducting membranes for fuel cells and to methods of constructing the same.

BACKGROUND OF THE INVENTION

A fuel cell device generates electricity directly from a fuel source, such as hydrogen gas, and an oxidant, such as oxygen or air. Since the process does not "burn" the fuel to produce heat, the thermodynamic limits on efficiency are much higher than normal power generation processes. In essence, the fuel cell consists of two catalytic electrodes separated by an ion-conducting membrane. The fuel gas (e.g. hydrogen) is ionized on one electrode, and the hydrogen ions diffuse across the membrane to recombine with the oxygen ions on the surface of the other electrode. If current is not allowed to run from one electrode to the other, a potential gradient is built up to stop the diffusion of the hydrogen ions. Allowing some current to flow from one electrode to the other through an external load produces power.

The membrane separating the electrodes must allow the diffusion of ions from one electrode to the other, but must keep the fuel and oxidant gases apart. It must also prevent the flow of electrons. Diffusion or leakage of the fuel or oxidant gases across the membrane leads to explosions and other undesirable consequences. If electrons can travel through the membrane, the device is fully or partially shorted out, and the useful power produced is eliminated or reduced.

It is therefore an object of this invention to produce a membrane which allows the diffusion of ions, but prevents both the flow of electrons and the diffusion of molecular gases. The membrane must also be mechanically stable.

In constructing a fuel cell, it is particularly advantageous that the catalytic electrodes be in intimate contact with the membrane material. This reduces the "contact resistance" that arises when the ions move from the catalytic electrode to the membrane and vice versa. Intimate contact can be facilitated by incorporating the membrane material into the catalytic electrodes. [See Wilson and Gottsfeld *J. Appl. Electrochem.* 22, 1–7 (1992)] It is therefore an object of the invention to produce a membrane wherein such intimate contact is easily and inexpensively made.

For reasons of chemical stability, fuel cells presently available typically use a fully fluorinated polymer such as Dupont Nafion® as the ion-conducting membrane. This polymer is very expensive to produce, which raises the cost of fuel cells to a level that renders them commercially unattractive. It is therefore a further object of this invention to produce an inexpensive ion-conducting membrane.

Ion-conducting polymers are known. (See Vincent, C. A., Polymer Electrolyte Reviews I, 1987). The known polymers are, for the most part, similar to sulfonated polystyrene because of the known ability of sulfonated polystyrene to conduct ions. Unfortunately, uncrosslinked, highly sulfonated polystyrenes are unstable in the aqueous environment of a fuel cell, and do not hold their dimensional shape.

U.S. Pat. No. 4,849,311 discloses that a porous polymer matrix may be impregnated with an ion-conducting polymer to produce a fuel cell membrane. However, the ion-conducting polymer must be dissolved in a solvent which "wets" the porous polymer. When the solvent evaporates, there is sufficient porosity remaining in the porous polymer/ion-conducting polymer composite material that molecular oxygen can leak through to the fuel gas and result in an explosion.

U.S. Pat. No. 3,577,357 (Winkler) discloses a water purification membrane composed of block copolymers of sulfonated polyvinyl arene block and alpha-olefin elastomeric blocks. In one example a styrene-iosprene-styrene triblock copolymer was selectively hydrogenated, then sulfonated using a premixed $SO_3$/triethylphosphate reagent at 60° C. for 1.5 hrs. A sulfonated styrene-(ethylene-propylene) copolymer was the result. The method provided solid agglomerates of the polymer which were rolled on a mill to remove water, swelled in cyclohexane, slurried in an isopropyl alcohol/water mixture, and coagulated in hot water. No membrane was produced, and we have found that polymers produced according to the method of Winkler cannot be cast into films.

Gray et al. [*Macromolecules* 21, 392–397 (1988)] discloses a styrene-butadiene-styrene block copolymer where the ion-conducting entity is a pendant short-chain of poly-(ethylene oxide) monomethyl ether (mPEG) complexed with $LiCF_3SO_3$ salt and connected through a succinate linkage to a flexible connecting entity which is the butadiene block of the triblock copolymer. The ion-conducting entity in the butadiene block is in the continuous phase of the polymer, and the areas populated by the ion-conducting entities do not preferentially touch each other to form continuous ion-conducting domains. This morphology does not facilitate the ion-conducting properties that are necessary for fuel cell operation. The styrene block functions only as a mechanical support structure for the polymer. Moreover, the molecular design chosen by Gray et al. is incompatible with the working environment of a fuel cell. Because the succinate linkage which joins the mPEG to the butadiene backbone and the ether linkages which join the ethylene oxide units are subject to cleavage by acid hydrolysis, these linkages are unstable in the low pH environment of a fuel cell even for short periods of time.

In the art of battery separators, as exemplified by U.S. Pat. No. 5,091,275, a number of porous polymers and filled polymer materials are known. The pores of these polymers and composite materials are filled with, typically, a liquid electrolyte to conduct ions from one electrode to another in a battery. However, these battery separator materials allow the passage of gases, so that fuel cells made with them have an unfortunate tendency to explode as the oxygen leaks into the hydrogen side of a fuel cell.

There is therefore a need for an inexpensive, mechanically and chemically stable, ion-conducting membrane.

SUMMARY OF THE INVENTION

In one aspect, the present invention relates to a membrane comprising a plurality of acid-stable polymer molecules each having at least one ion-conducting component covalently bonded to at least one flexible, rubbery connecting component. The membrane has ion-conducting components of the polymer molecules ordered such that a plurality of continuous ion-conducting channels penetrate the membrane from a first face to a second face and such that the ion-conducting channels are situated in an elastic matrix formed by the flexible connecting components. (See FIG. 1). Optimally, the channels have a cross-sectional dimension in the plane of the membrane of about 0.01 μm to 0.1 μm.
The flexible connecting component may be chosen from the group

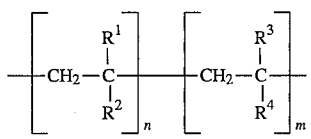

and the group

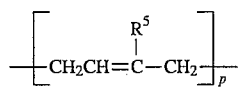

and the ion-conducting component may be chosen from the group

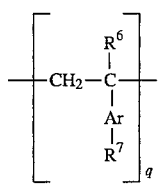

wherein $R^1$, $R^2$, $R^3$ and $R^4$ are chosen independently from the group consisting of hydrogen, phenyl and lower alkyl;

$R^5$ is hydrogen, chlorine or lower alkyl;

$R^6$ is hydrogen or methyl;

$R^7$ is —$SO_3H$, —$P(O)(OR^8)OH$, —$R^9$—$SO_3H$ or —$R^9$-$P(O)(OR^8)OH$ where $R^8$ is hydrogen or lower alkyl and $R^9$ is lower alkylene;

Ar is phenyl; and m, n, p and q are zero or integers from 50 to 10,000.

The terms lower alkyl and lower alkylene include hydrocarbons having from 1 to 6 carbons in linear, branched or cyclic structure.

In a preferred embodiment the flexible connecting component is chosen from the group consisting of poly(alpha-olefins), polydienes, and hydrogenated derivatives of polydienes, and the ion-conducting domain is provided by a component chosen from the group consisting of the sulfonic acids of polystyrene and poly(α-methylstyrene). Most preferably, the flexible connecting component is chosen from the group consisting of poly(ethylene-butylene) and poly(ethylene-propylene) and sulfonate or sulfoxide crosslinking occurs between the polystyrene or poly(α-methylstyrene) components. Another useful membrane is an acrylonitrile-butadiene-styrene terpolymer (ABS), the styrene component of which is sulfonated.

Because the precise structure of a preferred membrane of the invention is difficult to characterize, it may alternatively be described as a highly sulfonated polymeric membrane produced by the process of:

(a) adding a 3–4 wt % solution containing 3.6 equivalents of styrene-(ethylene-butylene)-styrene triblock copolymer in 80/20 dichloroethane/cyclohexane and a 3–4 wt % solution containing about 3.6 equivalents of sulfur trioxide in dichloroethane to a 0.6 wt % solution containing about one equivalent of triethylphosphate in dichloroethane at −5° to 0° C.;

(b) stirring for 15 to 30 minutes at −5° to 0° C., and then room temperature for 8 to 14 hours;

(c) heating at about 80° C. for 30 to 40 minutes until a purple color is evident;

(d) evaporating the dichloroethane and cyclohexane at 40° C. to obtain a viscous purple liquid;

(e) resuspending the viscous purple liquid to form a fine dispersion of 8 to 10 wt % in 80/20 dichloroethane/cyclohexane; and (f) casting the dispersion on a substrate to form a membrane. The membrane so formed absorbs at least 50% of its weight in water and in its fully hydrated state can be stretched to at least 100% of its original dimension without fracture. It exhibits a conductivity of at least $10^{-5}$ S/cm in its fully hydrated state.

The styrene-(ethylene-butylene)-styrene triblock copolymer which forms the substrate for the process described above may have a number average molecular weight of about 50,000 and styrene units may comprise about 20 to 35 wt % of the triblock copolymer. Preferably, the membrane is more than 25 mol % sulfonated.

In another aspect, the invention relates to a fuel cell comprising: (a) the membrane described above; (b) first and second opposed electrodes in contact with the membrane; (c) means for supplying a fuel to the first electrode; and (d) means for permitting an oxidant to contact the second electrode.

In one embodiment, one of the electrodes is composed of catalytic particles and the membrane functions as a binder for the electrode. In other embodiments, both electrodes may be composed of catalytic particles and the membrane functions as a binder for both electrodes.

In a related aspect the invention relates to an electrolysis cell having the same structure as the fuel cell above.

In a further aspect, the invention relates to a process for preparing a mechanically stable, ion-conducting membrane comprising the steps of:

(a) adding a solution containing 3.6 equivalents of a styrene-containing block copolymer in an appropriate solvent and a solution containing about 0.9 to 3.6 equivalents of sulfur trioxide in an appropriate solvent to a solution containing from about 0.3 to about 1.2 equivalents of triethylphosphate in an appropriate solvent at −5° to 0° C.;

(b) stirring for 15 to 30 minutes at −5° to 0° C., and then room temperature for 8 to 14 hours;

(c) heating at about 80° C. until a color change occurs;

(d) evaporating the solvent to provide a residue;

(e) resuspending the residue to form a fine dispersion in a suspending solvent; and (f) casting the dispersion on a substrate to form a mechanically stable, ion-conducting membrane.

As before, a preferred styrene-containing polymer is a styrene-(ethylene-butylene)-styrene triblock copolymer having a number average molecular weight of 50,000 wherein styrene units comprise about 30 to 35 wt % of the triblock copolymer. Preferably, the membrane is more than 25 mol % sulfonated.

In a particular embodiment, the process comprises:

(a) adding a 3–4 wt % solution containing 3.6 equivalents of styrene-(ethylene-butylene)-styrene triblock copolymer in 80/20 dichloroethane/cyclohexane and a 3–4 wt % solution containing about 3.6 equivalents of sulfur trioxide in dichloroethane to a 0.6 wt % solution containing about one equivalent of triethylphosphate in dichloroethane at −5° to 0° C.;

(b) stirring for 15 to 30 minutes at −5° to 0° C., and then room temperature for 8 to 14 hours;

(c) heating at about 80° C. for 30 to 40 minutes until a purple color is evident;

(d) evaporating the dichloroethane and cyclohexane at 40° C. to obtain a viscous purple liquid;

(e) resuspending the viscous purple liquid to form a fine dispersion of 8 to 10 wt % in 80/20 dichloroethane/cyclohexane; and (f) casting the dispersion on a substrate to form a membrane.

In a further aspect, the invention relates to a process for preparing a sulfonic acid ionomer of a styrene-(ethylene-butylene)-styrene triblock copolymer (SEBS), the improvement which comprises using a sulfur trioxide-triethylphosphate complex that is formed in the presence of the SEBS, whereby the SEBS is not less than 25 mol % sulfonated.

DETAILED DESCRIPTION INCLUDING PREFERRED EMBODIMENTS

Figure 1:
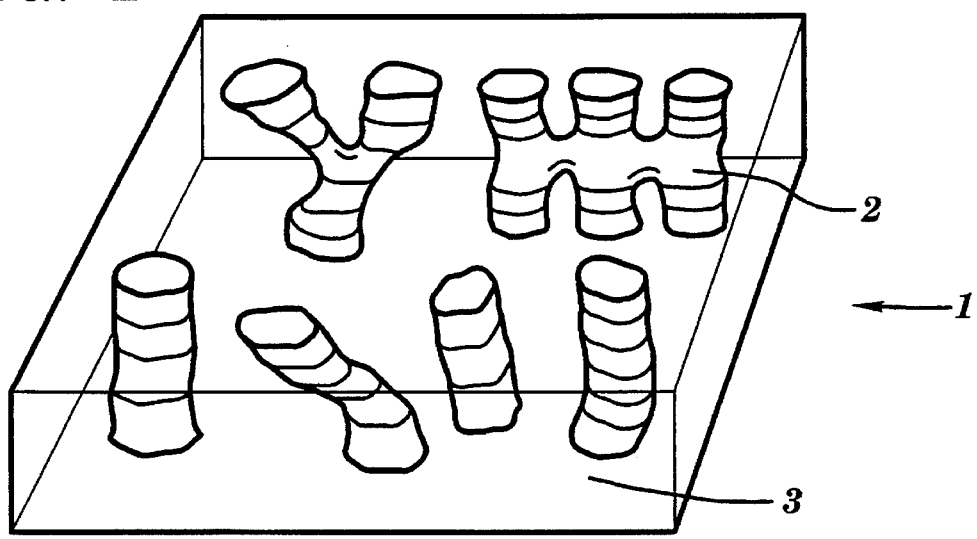
FIG. 1 is an idealized perspective view of a membrane according to the invention.

The ion-conductive polymer membrane of the invention is shown in FIG. 1 in schematic form. The membrane 1 is a multicomponent polymer composed of at least one ion-conducting component which is covalently bonded to at least one flexible component.

The minimum requirements for the ion-conducting component are that the ionic grouping (e.g. sulfonic or phosphonic acids) be a strong enough acid to provide sufficient dissociation of charge carriers (protons) in an aqueous environment, possess moderate temperature stability (up to at least 40° C.), and sufficient number of such groupings be present to potentially form a network of interconnected domains 2, which extends throughout the membrane 1 forming an ion conduction pathway from one side to the other side of the membrane.

The minimum requirements for a flexible connecting component are that the main chain of the grouping possess sufficient mobility at the operating temperature of the fuel cell to facilitate reorganization of the ionically conducting component into a domain to which it is connected, and to be insoluble in the aqueous environment of a fuel cell. The domains 3 formed by the flexible connecting components should be amorphous or at least partially amorphous at the operating temperature of the fuel cell.

There are a number of ways of connecting polymer components which can result in useful ionically conducting membranes.

In this invention, a sulfonated styrene-(ethylene-butylene) triblock copolymer (example 3) was considered the most preferred embodiment because of the superior mechanical properties that this arrangement possesses. However, other topological arrangements are possible.

For multicomponent polymers, the repeating units of each of the components can be connected in different sequences depending on the method of synthesis. The A and B units are connected in a sequence by covalent bonds such that the expression $[(A)_n(B)_m]p$, describes the polymer microstructure. If n units of A are covalently bonded to m units of B in sequences (p is arbitrary) where the stochastic process followed is Bernoullian (or zero-order Markov) then the polymer is a called a random copolymer. (The stochastic process followed depends on the relative reactivities of the two monomers in the copolymerization; see Odian, G., Principles of Polymerization, 1992.) However, if the stochastic process which the sequence of A and B units follow is not Bernoullian (e.g. terminal model or first-order Markov) then polymer is called a statistical copolymer.

Limiting cases exist for which the relative reactivities of the two monomers (A prefers to add B and B prefers to add A) result in the sequence -AB- to be repeated p times (for m=n) and this is called an alternating copolymer.

A second limiting case exists where (A prefers to add A and B prefers to add A until A is consumed, then B is added) the polymer is composed of two components, A and B, and n units of A are covalently bonded at one junction point (p=1) to m units of B, then each of these sequences of component s is called a block and the polymer is called a diblock copolymer. Similarly, if a third block of n units of A is bonded at a second junction point (p=2) on the B-block, then the polymer is called a triblock copolymer (and equivalently if a third block of m units of B is bonded to A).

If a sequence of m units of B are bonded to a sequence of n units A at one or more branch points ($p \geq 1$) along the sequence of m units of B then the polymer is called a graft (or graft-block, for p=1) copolymer.

Multi-block polymers, where p is the number of junction points for p+1 blocks, can also be envisioned as well as the less common star-block copolymers, where p is the number arms connected at one or more branch points.

Combinations of these types (e.g. statistical/block or statistical/graft) are also possible. Random, statistical and combination terpolymers are polymers which possess three unique units in the microstructure. An example is acrylonitrile-butadiene-styrene terpolymer where the butadiene or styrene-butadiene units compose the main chain and at various branch points a statistical arrangement of styrene and acrylonitrile units are positioned (i.e. statistical/graft).

A preferred embodiment of this invention is a graft copolymer of sulfonated styrene and butadiene where the sulfonated styrene block is covalently bonded to the butadiene block (or sulfonated styrene-butadiene sequence) at one or more branch points along the butadiene chain.

Another preferred embodiment of this invention is the combination statistical/graft of acrylonitrile-butadiene-sulfonated styrene terpolymer. A more preferred embodiment is the hydrogenated butadiene analog of each of the forementioned preferred embodiments.

The sulfonation of the styrene units of each of these topological arrangements can be achieved by the synthetic method described below. The introduction of sulfonate groups onto polystyrene is known. Early methods involved heating the polymer in sulfuric acid for hours; an improved method employs silver sulfate added to the sulfuric acid as a catalyst. More recently, complexes with a number of agents such as phosphorus pentoxide, triethyl phosphate and tris (2-ethylhexyl) phosphate have been used to modulate the reactivity of sulfur trioxide. Acyl sulfates, formed by premixing, include sulfuric acid/acetic anhydride, sulfur trioxide/acetic acid, sulfur trioxide/lauric acid, and chlorosulfonic acid/lauric acid. It has been suggested that the reduced reactivity of acyl sulfates results in better sulfonation control than was observed in previous methods with virtually no crosslinking. In addition, chlorosulfonic acid and trimethylsilyl-sulfonyl chloride have been found useful. Each requires hydrolysis to obtain the desired sulfonic acid. All of the above processes are conveniently carried out in chlorinated solvents (e.g. 1,2-dichloroethane, trichlorobenzene, methylene chloride, etc.) However, hydrocarbon solvents have been used with some success (e.g. cyclohexane).

Methylene units are readily inserted between the sulfonate group and the phenyl group by first carrying out an acylation of the ring with an α, ω-acyl/alkyl dichloride of desired carbon length and then transforming the chloride into the sulfonate. Polymers having improved temperature stability can often be obtained by the insertion of the methylene unit.

A unique route to sulfonated polymers is the use of sulfur dioxide and chlorine gases to chlorosulfonate polymers such as polyethylene. Again, the procedure requires hydrolysis to obtain the protonic form of the polymer.

Alternatively, it is possible to first sulfonate the monomers then to carry out the polymerization. The sulfonated monomers (protonic form) are sometimes polymerized in the sodium salt form or can be protected by forming the sulfonyl ester then polymerized. Ion exchange or hydrolysis follows to obtain the protonic form of the polymer.

Although less known, the phosphonation of polystyrene is also a viable route to ion-conducting groups. Phosphonic acid groups and alkyl substituted phosphonic acid groups may be introduced onto the polymer by alkylation with the corresponding chloroalkyl phosphonates or phosphonation with alkyl phosphites.

For the purpose of this invention, possible ion-conducting groups include —$SO_3H$ and $P(O)(OR^8)OH$ wherein $R^8$ is hydrogen or lower alkyl.

The most preferred ionic conducting groups are poly(styrene sulfonic acid) and poly(alpha-methyl styrene sulfonic acid). Poly(styrene sulfonic acid) and poly(alpha-methyl styrene sulfonic acid) may be analogously prepared and used.

The flexibility of a block or sequence of units which is covalently bonded to an ion-conducting group is an important object of this invention. Chain flexibility is associated with the glass transition temperature of the polymer, block or characteristic sequence of units. The glass transition temperature (or Tg) is the temperature at which large scale (translational and rotational) molecular motion of chains begins. Thus, it follows that above the glass transition temperature (i.e. Tg+50) the chains possess more mobility than below Tg (i.e. Tg—50). The Tg of a polymer is largely a function of the bonding, the nature of the atoms in the chain, the secondary forces, the chain substitution and chain connectivity.

The melting temperature of a chain-folded crystallite, $T_m$, has an effect on the chain flexibility. Because chains which crystallize are tied up in the crystalline regions, these have considerably less mobility. A good approximation for a linear hydrocarbon polymer is that the Tg is ⅔ the value of its Tm.

The crystallization of polymer chains can be reduced or eliminated by incorporating a nonsymmetrical (or symmetry-breaking) unit into the chain structure (e.g. introducing butylene units into polyethylene to give rise to ethylene-butylene polymers). This process has the effect of reducing crystallinity and increasing flexibility. For simplicity, Tg is used as a measure of chain flexibility.

Preferred flexible connecting groups of saturated origin are described by the formula,

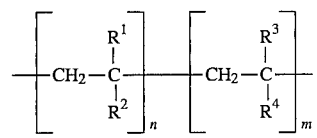

wherein $R^1$, $R^2$, $R^3$ and $R^4$ are independently hydrogen or lower alkyl. When $R^1$, $R^2$ and $R^3$ are hydrogen and $R^4$ is n-butyl, then the structure is ethylene-butylene.

The most preferred embodiment of the flexible connecting group is ethylene-butylene. The next most preferred is when the flexible connecting group is ethylene-propylene. The preparation of ethylene-butylene and ethylene-propylene are well known in the art.

Preferred flexible connecting groups of unsaturated origin are described by the formula,

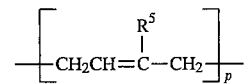

wherein $R^5$ is hydrogen, chlorine or lower alkyl. When $R^5$ is H, the structure is poly(1,4-butadiene); when $R^5$ is Cl, the structure is poly(chloroprene); and when $R^5$ is methyl, the structure is poly(1,4-isoprene). The preparation of poly(butadiene), poly(isoprene), poly(chloroprene) and their isomers are well known in the art.

The 1,2 isomers of polymers are also included in this set of unsaturated origin (with 1,4 isomers). It should be noted that different amounts of 1,2 isomers will be present in the 1,4 isomers depending on the catalyst used in the polymerization.

The molecular weight of the polymer should be preferably no less than 10,000 g/mol and most preferably be greater than 50,000 g/mol for adequate mechanical strength. A membrane thickness of 25–1000 μm, preferably 100–500 μm and most preferably 250–350 μm provides sufficient mechanical integrity to produce free-standing, useful membranes with enough ion-conductivity to cause acceptably low voltage drops under working conditions.

As measured by ac impedance analysis, the room temperature ionic conductivity of the fully hydrated membranes must be at least $10^{-6}$, preferably at least $10^{-4}$ and most preferably at least $10^{-2}$ S/cm. The electronic resistivity due to electron flow must be at least $10^2$, preferably at least $10^4$ and most preferably at least $10^6$ Ohm-cm.

As measured by analytical weight uptake measurements, the membranes should absorb between 10 and 150%, preferably between 30 and 100%, and most preferably between 50 and 80% water by weight. In the fully hydrated state, membranes can be stretched at least 10%, preferably 25%, and most preferably at least 50% of their original length.

The general requirements needed for a copolymer film to function well as fuel cell membrane are that the copolymer possess a flexible connecting component, such as a hydrogenated butadiene unit and an ion-conducting component. These two units must occur in the polymer, such as a sulfonated styrene unit, in such a way that the morphological structure of the polymer can give rise to a plurality of low resistance, ion transport pathways. The pathways are composed of a plurality of touching ion-conducting domains which are presumed to be elongated and organized into a cylindrical or channel type structure. A limited number of copolymers can be envisioned which can exhibit these types of structures.

Commercially available styrene-diene and styrene-hydrogenated diene triblock copolymers (Shell) are preferred membrane materials. The styrene content of between 28–31 wt % provides domains of elongated cylindrical morphology when cast from the appropriate solvent. The cylinders of polystyrene are apparently retained after sulfonation. These cylindrical domains of the styrene material are aligned parallel to each other in a grainy structure, each domain being separated by a layer of the elastomeric material which connects adjacent domains together.

Such a mixture of cylindrical conducting material, each cylinder separated from the next by a non-conducting material, would be expected to be non-conducting. We have found however, that when the material is sulfonated, and when it is then hydrated, that the sulfonated polystyrene domains swell and presumably punch through the surrounding elastic material to allow contact between neighboring cylinders. This contact presumably connects the aligned cylinders to each other end to end, and the conductivity is higher than that which one would expect from normal percolation models.

Diblock copolymers that can exhibit cylindrical domains can also be obtained commercially. Although they do not take advantage of the interconnected morphology of triblock copolymers, the insolubility of the hydrogenated butadiene units may be enough impart the required amount of mechanical integrity for fuel cell membranes. These can be hydrogenated using conventional methods (Wilkinson's catalyst) known to those skilled in the art. They may be sulfonated as easily as their triblock copolymer counterparts.

Graft copolymers are also available commercially or they may be isolated from commercial polymer resins. An example is high impact polystyrene (HIPS) which has a graft copolymer content of about 15% by weight. The grafted part may be extracted with an acetone-methyl ethyl ketone mixture. Similar transformation reactions can lead to a sulfonated styrene-hydrogenated butadiene copolymer. These can also exhibit morphologies possessing channels.

Controlled monomer feed conditions can provide random or statistical copolymers which possess chemical microstructures with various degrees of 'blockiness', where short sequences of styrene units are obtained. Segregated network type structures may then be possible. However, such substrates are inferior to those described above. A statistical copolymer of styrene-hydrogenated butadiene rubber when sulfonated may be capable of organizing into channels.

The exploitation of elastomers such as acrylonitrile-butadiene-styrene (ABS), acrylonitrile-chlorinated ethylene-styrene (ACS) and ethylene-propylene-diene (EPDM) polymers may also be possible, if the morphologies of these polymers are capable of organizing into channels after sulfonation. ABS, which is a butadiene backbone with a statistical copolymer of acrylonitrile-styrene grafted onto it, may exhibit channels after selective hydrogenation of butadiene followed by sulfonation of the styrene units.

A mixture of block copolymer and the hompolymer could also be used. At low percentages of the homopolymer, the block copolymer would determine the morphology of the material.

ACS is similar in preparation to ABS. It is prepared by partial dehydrohalogenation of chlorinated polyethylene leading to double bonds which can be subsequently reacted to produce acrylonitrile-styrene grafts; the styrene units are then sulfonated. Channels may be possible at a critical styrene composition.

Ethylene-propylene-diene, the diene usually being hexadiene, may be sulfonated using methods described herein. At a critical composition of the diene, a channel structure may be possible.

EXAMPLES

The fuel cell assembly used in all experiments was a low pressure clamping cell, an electrochemical test stand was used for collecting data and porous carbon catalyst electrodes (20% Pt on carbon) were all obtained from Electrochem, Inc., Woburn, Mass. The carbon electrodes had a platinum loading of 1 mg/cm$^2$ of flat area and Nafion 117 was used as the binder (see Gottesfeld, S. and Wilson, M. S., J. Appl. Electrochem., 22, 1, 1992). Commercial hydrogen and oxygen gases were used without pressurization or humidification. The experiments were carried out at room temperature (23° C).

The ionic conductivity measurements were carried out with a 1260 impedance analyzer from Schlumberger Instruments, Inc., Burlington, Mass. A hydrated film was inserted between the two blocking electrodes of a spring-loaded cell. A 5 mV ac voltage was applied. The frequency range of the experiment was 50 mHz to 1 MHz. The method is similar to that described by Vincent, C. A., Polymer Electrolyte Reviews I, 1987. Conditions and equipment in the subsequent examples are those described here except where specified.

Example 1

Fuel Cell Performance of Nafion 117 (Comparative)

The Nafion 117 membrane was obtained from Dupont, Wilmington, Del. and was used as received. After one week of immersion in distilled water, the ionic conductivity of the membrane was measured to be 5×10–7 S/cm. In a typical experiment Nafion was hot pressed between two porous carbon catalyst electrodes (Electrochem Inc., Woburn, Mass.) using low pressure. The carbon electrodes had a platinum loading of 1 mg/cm$^2$ of flat area and incorporated Nafion 117. The Nafion membrane was immersed in distilled water for thirty minutes prior to testing. The fuel cell produced 5 mA/cm$^2$ at 400 mV for a short period of time (ca. 10 min.). However, a steady drop in current and voltage was observed over the next 25 minute period as the membrane dried out. After this time, the cell was completely dried out with zero current and voltage. Frequently, after the cell was disassembled to check for water retention, it was found that the electrodes had separated from the membrane.

Example 2

Preparation and Testing of an Ionically Conductive, Sol-Gel Impregnated, Microporous Polyethylene Membrane (Comparative)

1. The Sol-Gel Formulation: To a dry 250 ml beaker fitted with a magnetic stir bar, 8.68 grams (0.042 mol) of tetraethoxysilane was added. While stirring 51.76 grams (0.215 mol) of phenyltriethoxysilane (PTES) was added, and 11.50 grams (0.25 mol) of absolute ethanol. Next 17.5 grams (0.28 mol) of concentrated nitric acid (70.6% by weight) was added dropwise over the course of about 15 minutes. A clear, low viscosity liquid was obtained.

2. Impregnation of Microporous Polyethylene Membranes (Evanite Fiber Corporation, Corvalis, Ore.): Enough of the liquid was poured into a shallow, glass vessel (e.g. watch glass) to a depth of about 5 mm. Membranes (2 in.×2 in.) were immersed into the liquid. The membranes were allowed to soak until the solution completely permeated them. Next, the membranes were turned over in the vessel to ensure homogeneous infiltration of the liquid. The membranes were allowed to soak for 2–3 minutes. The membranes were removed, placed on a Teflon® sheet for several minutes to remove excess liquid, then hung on clip for 8 hours to cure. In one case, sulfonated PTES (see step 4) was used at this stage instead of sulfonating (in step 3) after impregnation.

3. Sulfonation of the Silane Impregnated Membranes: Sulfonation was carried out by immersing the silane impregnated membrane into hot, concentrated sulfuric acid (97% by weight) at 60°–70° C. The residual acid was remove by immersing the sulfonated membranes into distilled water. The degree of sulfonation was controlled by the time of immersion in the sulfuric acid (ca. 30 min.).

4. Sulfonation of Phenyltriethoxysilane (PTES): About 14.94 grams (0.108 mol) of triethyl phosphate-sulfur trioxide complex (1:3) was dissolved in 100 ml of dry methylene chloride and the solution was carefully added to a graduated addition funnel. To a dry 250 ml 3 neck round bottom flask fitted with a condenser, argon purge line and addition funnel, 25.88 grams (0.108 mol) of PTES and 25 ml of methylene chloride were added. The reactor was cooled to −4° to −2° C. The $SO_3$ solution was slowly fed to the reactor while keeping the reaction temperature <−2° C. Upon completion of the addition, the reaction temperature was held at <−2° C. for thirty minutes. Next, the reactor was allowed to come to room temperature (~23° C.). Most of the solvent was vacuum stripped from the sulfonated PTES. Alternatively, a similar compound 2-(4-chlorosulfonylphenyl) ethyltrimethoxysilane (Huls, Piscataway, N.J.) was used in place of sulfonated PTES. The acid was produced by immersing the cured membranes in boiling water.

5. Experimental Results: The membranes were immersed in distilled water, shaken dry of adherent water and sandwiched between two porous platinum wire electrodes. The sulfonated membranes gave stable current (ca. 50 mV at 4 $mA/cm^2$) for approximately 30 minutes. After this time, the current began to fall precipitously, because of excessive oxygen/hydrogen gas leakage. In more than a few experiments, oxygen and hydrogen reacted explosively, emitting puffs of smoke from the hydrogen gas outlet port, resulting in a unsightly hole in the membrane.

Example 3

The Preparation and Testing of Sulfonated Styrene-(Ethylene-Butylene)-Sulfonated Styrene Triblock Copolymer 1. Preparation of Sulfonated Styrene-(ethylene-butylene) Triblock Copolymer: The styrene-(ethylene-butylene)-styrene triblock copolymer (SEBS) was obtained from Shell Chemical Co., Lisle, Ill. under the tradename Kraton®. A 3.8 wt % solution of the SEBS copolymer was prepared in a solvent mixture having a composition of 80 wt % 1,2-dichloroethane (DCE) and 20 wt % cyclohexane. The dissolution sequence was as follows: About 10 grams (0.03 mol, 3.1 grams styrene) of the triblock copolymer was added to 200 grams of DCE and allowed to mix for 2–4 hours. A cloudy emulsion was obtained. Warming the solution favored the formation of a slightly tinted polymer microemulsion. About 53 grams of cyclohexane was added and after stirring for a few minutes a clear solution was obtained. The polymer solution was transferred to a 500 mL dropping funnel.

Sulfur trioxide ($SO_3$) was weighed out into a glass vessel while in an inert gas glove bag. A 3.4 wt % solution of $SO_3$ in DCE was prepared. About 2.34 grams (0.03 mol) of $SO_3$ (bp 17° C.) was dissolved in 66 grams of DCE. The solution was transferred to an appropriate dropping funnel.

A resin kettle (reactor) was fitted with an electric motor using a variable transformer, a paddle, an argon gas inlet/outlet, oil bubbler, two Claissen adaptors, and the two dropping funnels. The reactor was charged with 262 grams of DCE and 1.5 grams (0.0082 mol, 3.6:1 $SO_3$) of triethyl phosphate (TEP). Vigorous agitation and inert gas purge was begun and the reactor was cooled to −2° C. in an ice/ethanol Dewar. The $SO_3$ and polymer solutions were added alternately dropwise to the reactor in small aliquots. The aliquot size (e.g. 4–5 ml for $SO_3$) was roughly 1/12 the total volume of each of the solutions. The aliquots were added slowly, over the course of 5 minutes for the $SO_3$ and over the course of 5–10 minutes for the polymer. A rapid inert gas stream, a temperature range of −5 to 0° C. (−2° C. nominal), and vigorous stirring were maintained throughout the course of the reaction. After all of the aliquots for each of the solutions had been added, the reaction was left stirring at low temperature for between 15 and 20 minutes. At the end of this period the extraneous glassware was removed, the orifices were capped, and the paddle assembly was replaced with a stir bar and a magnetic stirrer. The reactor was allowed to stir overnight and warm up to room temperature (20°–25° C.).

The mixture was filtered through coarse filter paper. The liquid (filtrant) was transferred to a beaker and heated to boiling on a hot plate until a distinct purple color was apparent (after about 30–40 minutes). The solution was concentrated on a rotary evaporator at 40° C. and partial vacuum until a viscous purple liquid was obtained. Next, the viscous liquid was resuspended in about 62 grams (enough for a 3–5 wt % solution) of DCE. The DCE was allowed to evaporate until undissolved gel was formed on the walls of the container (about 8–10 wt % solution). The liquid was decanted and enough cyclohexane was added to dissolve a large portion of the undissolved gel. The two solutions were mixed and concentrated by evaporation (roughly 80% DCE) until a fine dispersion of the polymer was obtained.

This dispersion was cast onto Teflon® and onto aluminum substrates to form a highly conducting membrane. The membrane absorbs at least 50% of its weight in water. The film could be stretched as much as 100% of its original length. As measured by ac impedance analysis, the room temperature, dc conductivity of the fully hydrated film was no less than $10^{-5}$ S/cm.

The polymer was 50 mol % sulfonic acid based on the styrene content from titration, and the solution was heated to boiling and held until it turned a red-purple color.

There are two features of the foregoing process that appear important to producing useful polymers: (1) sulfonating to high sulfonate levels, and (2) heating the sulfonation mixture after sulfonation. Heating of the sulfonation reaction solution is necessary for the formation of a viscous dispersion (5–10% solids) which can be cast into films. The dispersion is not formed unless heated and only after a red-purple solution is obtained. It is believed that the heating step may cause decomposition of sulfonate groups and/or crosslinking through sulfone or sulfonyl ester linkages, although applicants do not wish to be held to this theory.

The process of the invention provides a film which is sulfonated to a level of 53 mol %. This level of sulfonation is attainable in about 1.5 hrs at −3° C. In the procedure of Winkler (U.S. Pat. No. 3,577,357), the sulfonation was also carried out for 1.5 hrs but at 60° C. However, as described in a comparative example in U.S. Pat. No. 5,239,010, the procedure of Winkler results in a polymer with only 10 mol % sulfonation. The water adsorption of such a film would be about 5%. This would indicate that even if Winkler's polymer could be cast, it would probably not function well as an ion-conducting membrane.

2. Fuel cell Performance of Sulfonated SEBS: The membrane was immersed in distilled water, shaken dry of adherent water and sandwiched between two porous carbon catalyst electrodes. Initially, the fuel cell produced 50 mA/cm$^2$ at 400 mV and continued to improve. After 72 hours the current climbed to 115 mA/cm$^2$ at 450 mV.

The same features of the membrane that lend themselves to its use in fabricating fuel cells also render it suitable for use in fabricating an electrolysis cell for electrolyzing water to hydrogen and oxygen. The electrode processes that occurred in the fuel cell to produce electrical energy and water by consuming hydrogen and oxygen can be reversed to consume energy and produce hydrogen and oxygen from water. A voltage is applied across the cell to oxidize water to oxygen and protons, and the protons are allowed to pass through the membrane to the cathode, where they are reduced with concomitant production of hydrogen gas. Water is continuously supplied to the anode, and hydrogen and oxygen are drawn off the cathode and anode respectively. The most immediate utility of such a cell is as a power storage device wherein the hydrogen and oxygen so produced are stored and reused to power the fuel cell upon demand.

Figure 2:
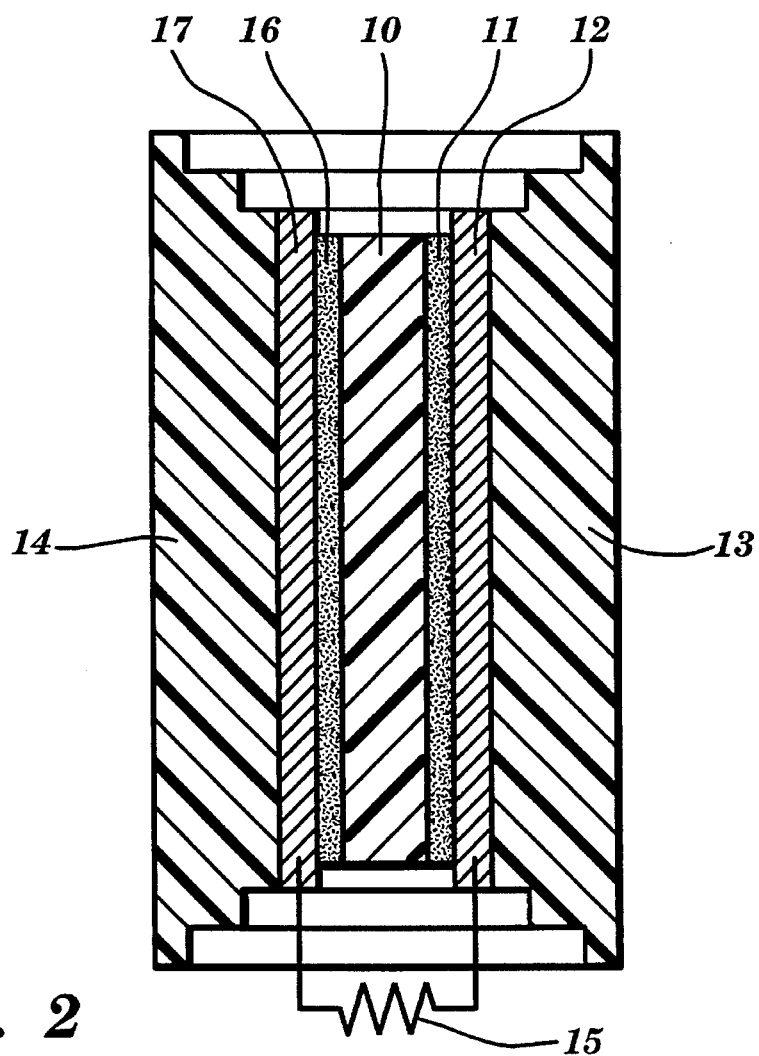
FIG. 2 is a schematic diagram of a typical fuel cell incorporating a membrane of the invention.

A typical cell is shown in FIG. 2. It comprises an ion-conducting membrane 10, a catalyst electrode 11, current collector 12 and oxidant manifold 13. On the opposite side of the membrane 10 are a second catalyst electrode 16, a second current collector 17, and a fuel manifold 14.

Its operation as a fuel cell is described as follows with hydrogen as the fuel, but any oxidizable fuel could be used. Hydrogen is fed into the fuel manifold 14. Hydrogen reacts with catalyst electrode 16 to form protons. The electrons which are formed by the interaction of the hydrogen and catalyst in the hydrogen electrode are collected by the hydrogen current collector 17 and fed into the external electrical load 15. The protons are absorbed by the ion-conducting membrane 10. Oxygen is fed into the oxidant manifold 13. The oxygen reacts with the catalyst in the oxygen electrode and the electrons returning from the external electrical load 15 through the oxygen current collector 12 to form oxygen radicals within the catalyst electrode 11. Protons from the ion-conducting membrane 10 seek out the oxygen radicals driven by the electrical potential created by the formation of the oxygen radicals. Protons combine with the oxygen radicals to form water in the oxygen electrode completing the electro-chemical circuit. The water is released by the electrode 11 and removed from the cell through the manifold 12.

While the invention has been particularly shown and described with reference to preferred embodiments thereof, it will be understood by those skilled in the art that other changes in form and details may be made therein without departing from the spirit and scope of the invention.

We claim:

1. A water-insoluble membrane comprising a plurality of acid-stable polymer molecules each having at least one ion-conducting polymer segment covalently bonded to at least one flexible connecting polymer segment, said membrane having said ion-conducting polymer segments ordered such that a plurality of continuous hydrogen-ion-conducting channels penetrate the membrane from a first face to a second face, said hydrogen-ion-conducting channels being regions containing anionic species situated in an elastic matrix, said elastic matrix formed by said flexible connecting polymer segments, wherein the flexible connecting polymer segment is chosen from the group

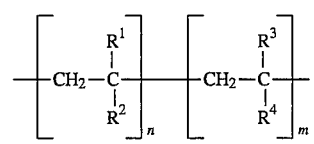

and the group

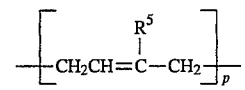

and wherein the ionic conducting component is chosen from the group

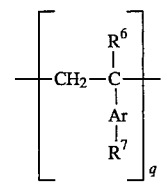

wherein $R^1$, $R^2$, $R^3$ and $R^4$ are chosen independently from the group consisting of hydrogen and lower alkyl;

$R^5$ is hydrogen, chlorine or lower alkyl;

$R^6$ is hydrogen or methyl;

$R^7$ is a mixture of hydrogen and a residue chosen from the group consisting of —SO$_3$H, —P(O)(OR$^8$)OH, —R$^9$—SO$_3$H and —R$^9$—P(O)(OR$^8$)OH where R$^8$ is hydrogen or lower alkyl and R$^9$ is lower alkylene;

Ar is phenyl; and m, n, p and q are zero or integers from 50 to 10,000.

2. A membrane according to claim 1, wherein said membrane consists of a styrene-(ethylene-butylene)-styrene copolymer (SEBS), the styrene component being sulfonated.

3. A membrane-according to claim 2, wherein said styrene-(ethylene-butylene)-styrene copolymer is sulfonated to the extent of at least 25 mol %.

4. The membrane of claim 1, wherein the flexible connecting component is chosen from the group consisting of poly(alpha-olefins), polydienes, and hydrogenated derivatives of polydienes.

5. The membrane of claim 4, wherein the flexible connecting component is chosen from the group consisting of poly(ethylene-butylene) and poly(ethylene-propylene) and the ion-conducting domain is provided by a component chosen from the group consisting of the sulfonic acids of polystyrene and poly(α-methylstyrene), said membrane further characterized in that sulfonyl ester or sulfone crosslinking occurs between said polystyrene or poly(α-methylstyrene) components.

6. A fuel cell comprising: (a) the membrane of any of claims 4, 5, 1, 2 or 3; (b) first and second opposed electrodes in contact with said membrane; (c) means for supplying a fuel to said first electrode; and (d) means for permitting an oxidant to contact said second electrode.

7. A fuel cell according to claim 6 wherein one of said first and second electrodes is composed of catalytic particles and said membrane functions as a binder for said electrode.

* * * * *